United States Patent
Wiebe et al.

(10) Patent No.: US 7,272,930 B2
(45) Date of Patent: Sep. 25, 2007

(54) EXHAUST DIFFUSER ASSEMBLY WITH TUNABLE VELOCITY PROFILE

(75) Inventors: David James Wiebe, West Palm Beach, FL (US); Eric Christopher Berrong, Winter Springs, FL (US)

(73) Assignee: Siemens Power Generation, Orlando, FL (US)

( * ) Notice: Subject to any disclaimer, the term of this patent is extended or adjusted under 35 U.S.C. 154(b) by 642 days.

(21) Appl. No.: 10/671,290

(22) Filed: Sep. 25, 2003

(65) Prior Publication Data

US 2005/0066647 A1  Mar. 31, 2005

(51) Int. Cl.
 *F02K 1/78* (2006.01)
 *B63H 11/10* (2006.01)
(52) U.S. Cl. .................... 60/770; 239/265.19
(58) Field of Classification Search ............... 60/39.5, 60/761, 766, 770; 239/265.11, 265.19
See application file for complete search history.

(56) References Cited

U.S. PATENT DOCUMENTS

| | | | | |
|---|---|---|---|---|
| 3,058,302 A | * | 10/1962 | Kuzyk | 60/770 |
| 4,284,170 A | * | 8/1981 | Larson et al. | 239/265.19 |
| 4,731,991 A | * | 3/1988 | Newton | 60/226.2 |
| 4,930,308 A | * | 6/1990 | Fage | 239/265.19 |

* cited by examiner

Primary Examiner—Michael Koczo, Jr.

(57) ABSTRACT

A turbine engine exhaust diffuser assembly having a tuneable exhaust velocity profile is disclosed. The assembly includes structure that generates a desired, tunable velocity profile within working fluid exiting the exhaust diffuser assembly. The exhaust assembly includes an concentric boundary sleeves that extend along a central axis and form an exhaust flowpath between them. A flow deflecting member disposed within the flowpath longitudinally divides the flowpath into a first region and a second region. The first region is characterized by a first predetermined velocity profile, and the second region is characterized by a second predetermined velocity profile. The second velocity profile is determined by at least one pre-selected dimension of the flow deflecting member. Methods of maximizing HRSG energy extraction capacity and extending HRSG lifespan are also disclosed.

10 Claims, 6 Drawing Sheets

EXHAUST DIFFUSER ASSEMBLY WITH TUNABLE VELOCITY PROFILE

FIELD OF THE INVENTION

This invention relates generally to the field of internal combustion engines and, more particularly, to an exhaust diffuser having tunable velocity profile properties.

BACKGROUND OF THE INVENTION

Combustion engines are machines that convert chemical energy stored in fuel into mechanical energy useful for generating electricity, producing thrust, or otherwise doing work. These engines typically include several cooperative sections that contribute in some way to the energy conversion process. In gas turbine engines, air discharged from a compressor section and fuel introduced from a fuel supply are mixed together and burned in a combustion section. The products of combustion are harnessed and directed through a turbine section, where they expand and turn a central rotor shaft. The rotor shaft may, in turn, be linked to devices such as an electric generator to produce electricity.

To increase efficiency, engines are typically operated near the operational limits of the engine components. For example, to maximize the amount of energy available for conversion into electricity, the products of combustion (also referred to as the working gas or working fluid) often exit the combustion section at high temperature. This elevated temperature generates a large amount of potential energy, but it also places a great deal of stress on the downstream fluid guide components, such as the blades and vanes of the turbine section.

In many gas turbine applications, working fluid remains at high temperature even after passing through the turbine section of the engine. In these cases, additional energy may be extracted from the working fluid even after it exits the turbine section. Heat recovery steam generators (HRSGs), for example, may be used to harness energy remaining in the turbine section exhaust. Such HRSGs are typically located downstream of the engine combustion and turbine sections and use heat from the working fluid leaving the turbine section to boil water, or other suitable liquid, to produce steam. The steam is then directed to an associated steam turbine, where additional energy is recovered. In this way, return on fuel consumption increases and operational efficiency is desirably raised.

While HRSGs may be used in some situations to recover extra energy from turbine section exhaust, there are difficulties associated with this arrangement. For example, energy within the working fluid may not be removed efficiently in some engine arrangements. In other settings, HRSG components fail prematurely due to exposure to working fluid having localized unacceptably-high temperatures. Accordingly, there remains a need in this field to improve HRSG performance.

SUMMARY OF THE INVENTION

The present invention is an exhaust diffuser assembly that improves HRSG performance. The assembly includes structure that generates a desired, tunable velocity profile within working fluid exiting the exhaust diffuser assembly. The exhaust assembly includes an outer boundary member that extends along a central axis and an inner boundary member located radially-inward of the outer boundary; the inner boundary member also extends along the central axis. The boundary members, or sleeves, form an exhaust flowpath between them, and a flow deflecting member disposed within the flowpath longitudinally divides the flowpath into a first region and a second region. The first region is characterized by a first predetermined velocity profile, and the second region is characterized by a second predetermined velocity profile. The second velocity profile is determined by at least one pre-selected dimension of the flow deflecting member. Advantages of this invention will become apparent from the following description taken in conjunction with the accompanying drawings wherein are set forth, by way of illustration and example, certain embodiments of this invention. The drawings constitute part of this specification and include exemplary embodiments of the present invention and illustrate various objects and features thereof.

DETAILED DESCRIPTION OF THE INVENTION

Reference is made to the Figures generally, in which an exhaust diffuser assembly 10 according to the present invention is shown. The assembly 10 includes elements that allow the radial distribution or velocity profile of fluid 18 leaving the assembly to be strategically tuned without negatively impacting the operational performance of the engine turbine section 14. According to one aspect of the invention, the exhaust diffuser assembly 10 increases combined cycle HRSG 12 effectiveness. According to another aspect of the invention, the diffuser assembly 10 maximizes combined cycle engine HRSG 12 life.

Figure 1:
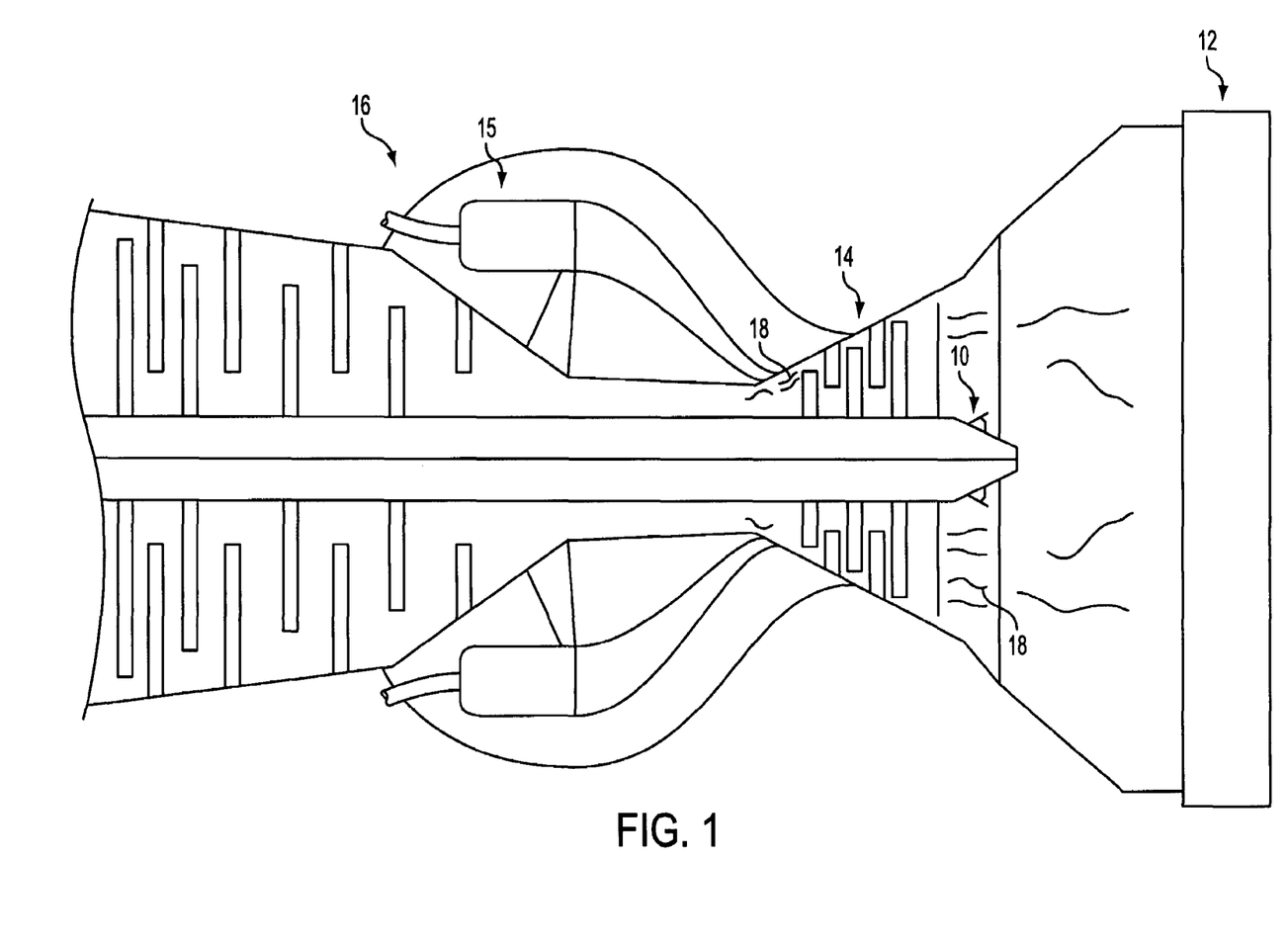
FIG. 1 is a side view of an combined cycle engine using the exhaust diffuser assembly of the present invention.

By way of overview, and with particular reference to FIGS. 1 and 2, the exhaust diffuser assembly 10 of the present invention will be described in the context of a combined cycle application, in which high-temperature working fluid 18 exiting the turbine section 14 of an industrial gas turbine engine 16 is directed through the present exhaust diffuser assembly 10 to a downstream heat recovery steam generator 12, where additional heat remaining in the working fluid 18 is extracted and converted into steam. The exhaust diffuser assembly 10 includes a longitudinally-extending outer boundary sleeve 20 radially spaced apart from a longitudinally-extending inner boundary sleeve 22. The sleeves 20,22 share a common axis 24 and cooperatively define an exhaust flowpath 26 that fluidly links the turbine section 14 with the HRSG 12. An angled flow deflecting member 36 divides the flowpath 26 longitudinally into a first region 32 and a second region 34, with the deflector member producing a strategically selected velocity profile 40 within the second region. As will be described more fully below, the nature of the second velocity profile 40 is determined by properties of the flow deflecting member 36 strategically selected to establish a desired radial distribution of heat, thereby providing customized interaction between the working fluid and the HRSG 12. The exhaust diffuser assembly 10 of the present invention will now be described in detail.

As noted above, and with continued reference to FIGS. 1 and 2, a first embodiment of the exhaust diffuser assembly 10 of the present invention is especially suited for use in a combined cycle industrial gas turbine engine 16. It is noted, however, that the exhaust diffuser assembly 10 may be advantageously employed in other applications, such as a simple cycle gas turbine with a need for a tuned exhaust profile and need not be used in combination with a HRSG 12. For purposes of clarity, however, the present discussion will be directed to the combined cycle setting described above.

As noted above, the exhaust diffuser assembly 10 includes two boundary sleeves 20,22 that form a longitudinally-extending flowpath 26 between the turbine 14 and HRSG 12. The boundary sleeves 20,22 are elongated and extend from a first end 28 of the assembly 10 to a downstream second end 30. Radial spacing between the outer and inner sleeves 20,22 varies with longitudinal position along the flowpath 26, and the spacing establishes at least two flow conditioning zones 42, 44 within the flowpath 26.

Figure 5:
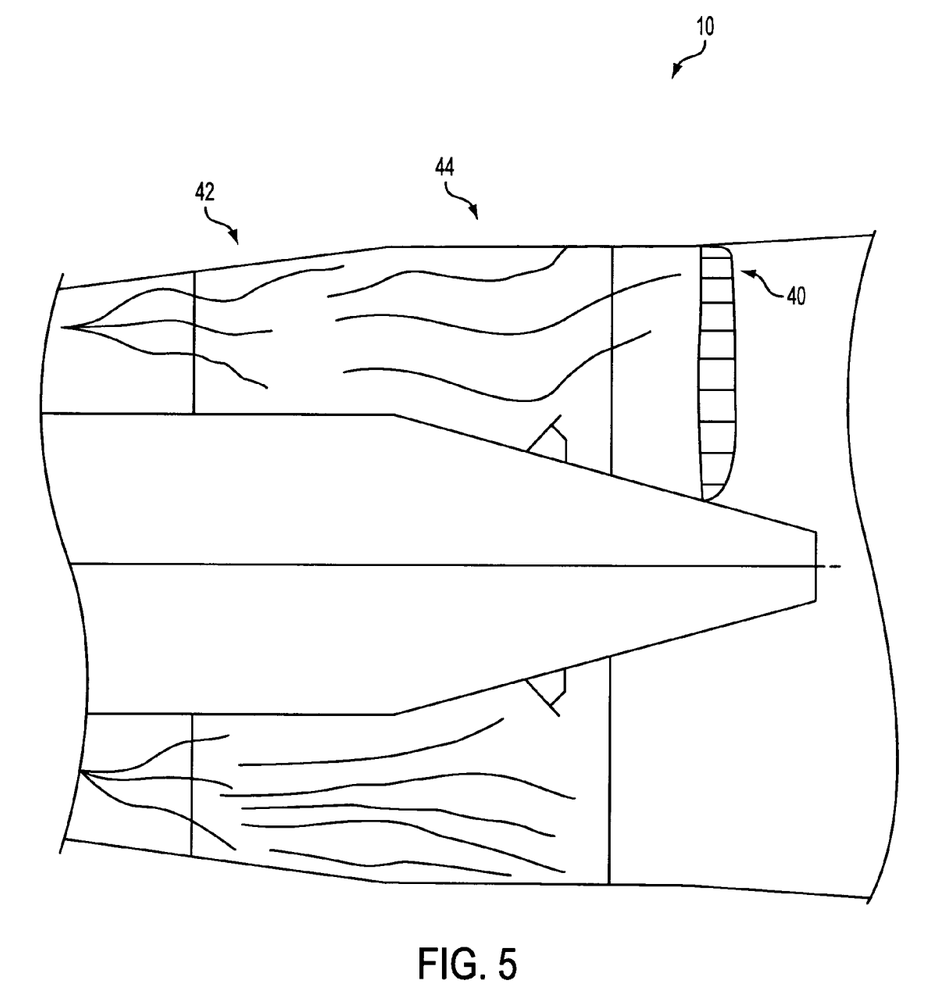
FIG. 5 is a close-up view of the exhaust diffuser assembly shown in FIG. 1, showing a first velocity flow profile.
Figure 6:
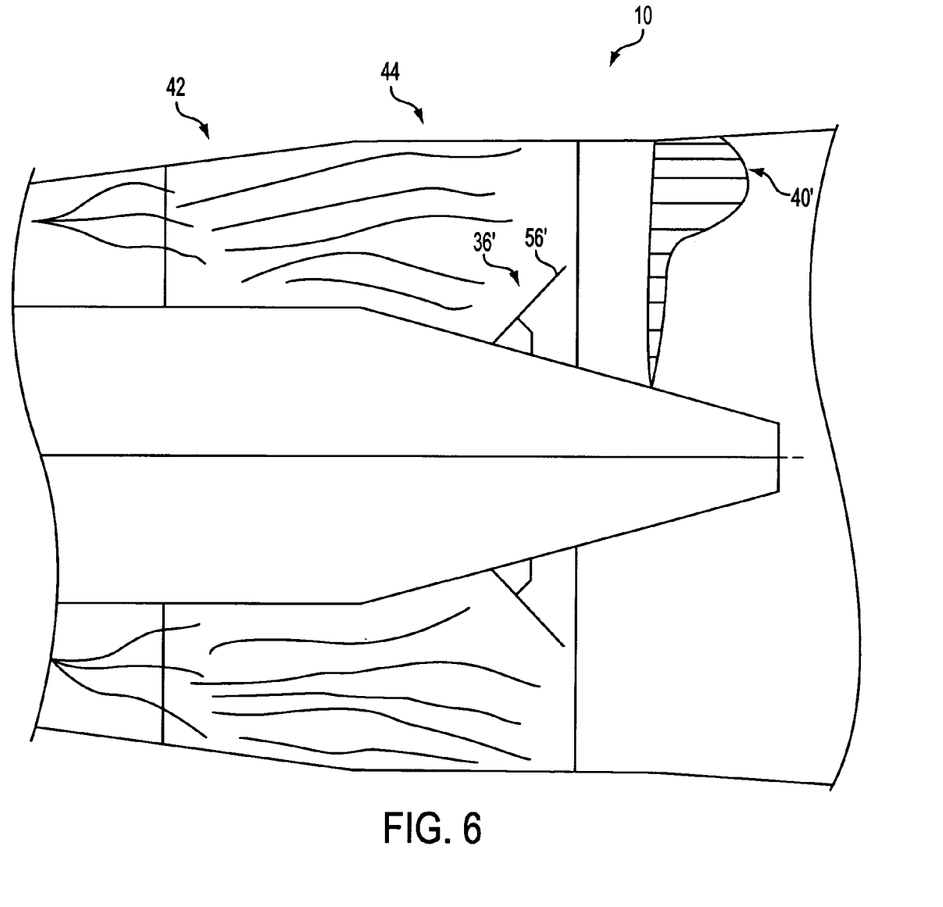
FIG. 6 is a close-up view of the exhaust diffuser assembly shown in FIG. 1, showing an additional velocity flow profile.

As illustrated in FIGS. 5 and 6, the first conditioning zone 42 allows working fluid 18 to diverge after exiting the turbine 14 and introduces a gradual reduction in dynamic pressure. The second conditioning zone 44 promotes additional, more-rapid divergence, further lowering the overall velocity of the working fluid 18 and lengthening the residence time of the fluid within the HRSG 12. With this arrangement, the conditioning zones 42,44 cooperatively ensure that working fluid 18 travels through the turbine 14 and into the exhaust diffuser assembly 10 in a free-flowing manner, at a velocity that promotes energy-transferring interaction between the working fluid and the HRSG 12.

Figure 2:
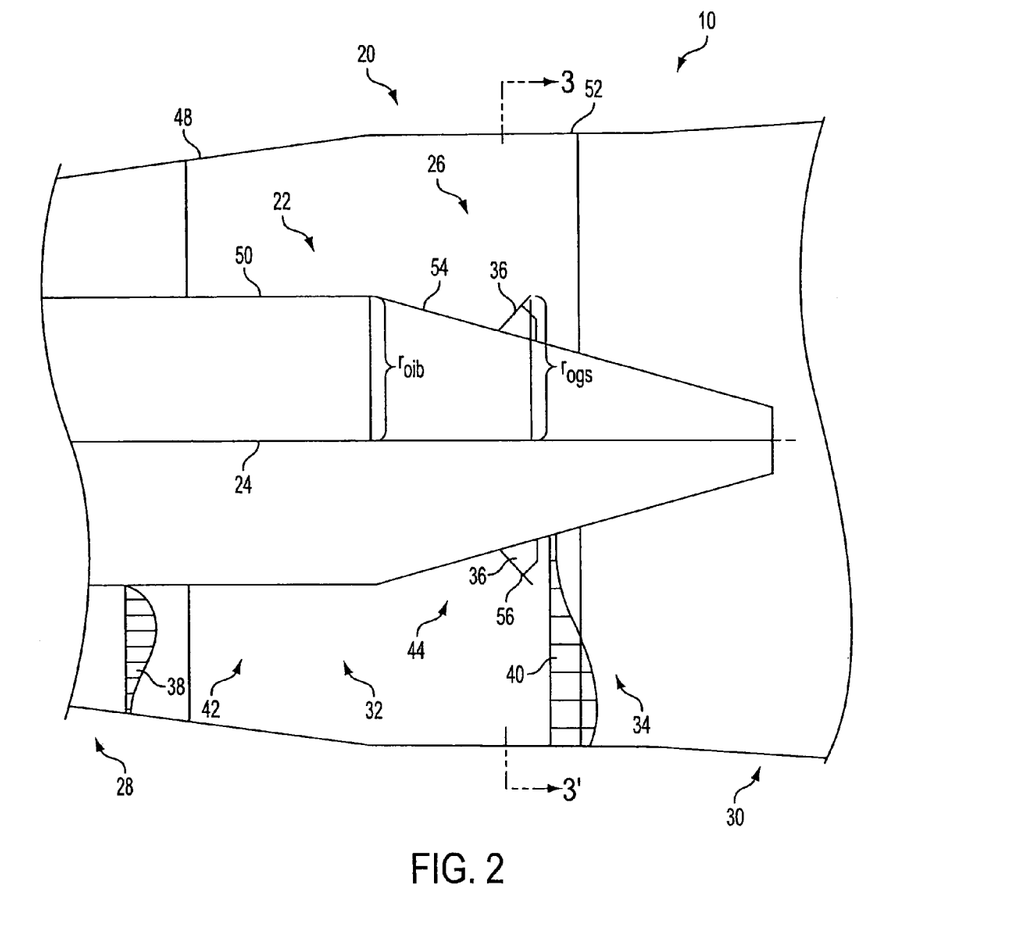
FIG. 2 is a close-up view of the exhaust diffuser assembly shown in FIG. 1.

With respect to FIG. 2, the first conditioning zone 42 is bounded by a first portion 48 of the outer boundary sleeve 20 characterized by an increasing radius and an inner boundary sleeve first portion 50 characterized by a substantially-constant radius. It is noted, however, that the outer boundary sleeve 20 need not be characterized by a diverging section followed by non-diverging and diverging sections, as shown in FIG. 2; the sleeve could also be characterized simply by an extend section of diverging radius (not shown), or a relatively short diverging section (not shown) and then a flow-wise-downstream continuous region of non-divergence. The contours of the outer boundary sleeve 20 are chosen in accordance with desired flow properties requirements. The second conditioning zone 44, located immediately downstream of the first conditioning zone 42, is bounded by an outer boundary sleeve second portion 52 characterized by a substantially-constant radius and an inner boundary sleeve second portion 54 characterized by a decreasing radius. The relative boundary sleeve spacing need not be produced in the manner described above; other arrangements that produce the divergence described in each conditioning zone 42,44 above would also suffice and are contemplated by this invention.

Figure 3:
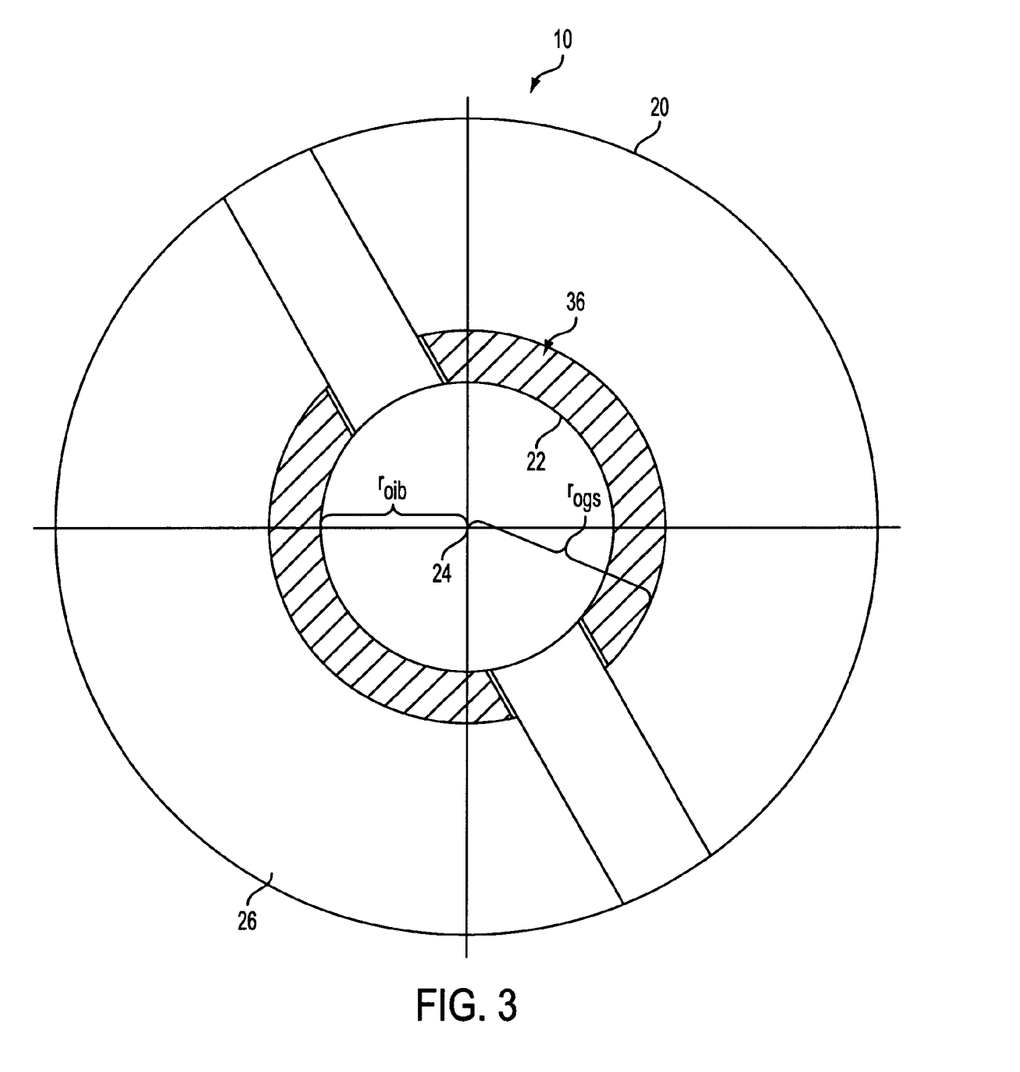
FIG. 3 is cross-section view of the exhaust diffuser assembly shown in FIG. 2, taken along cutting plane 3-3' therein
Figure 4:
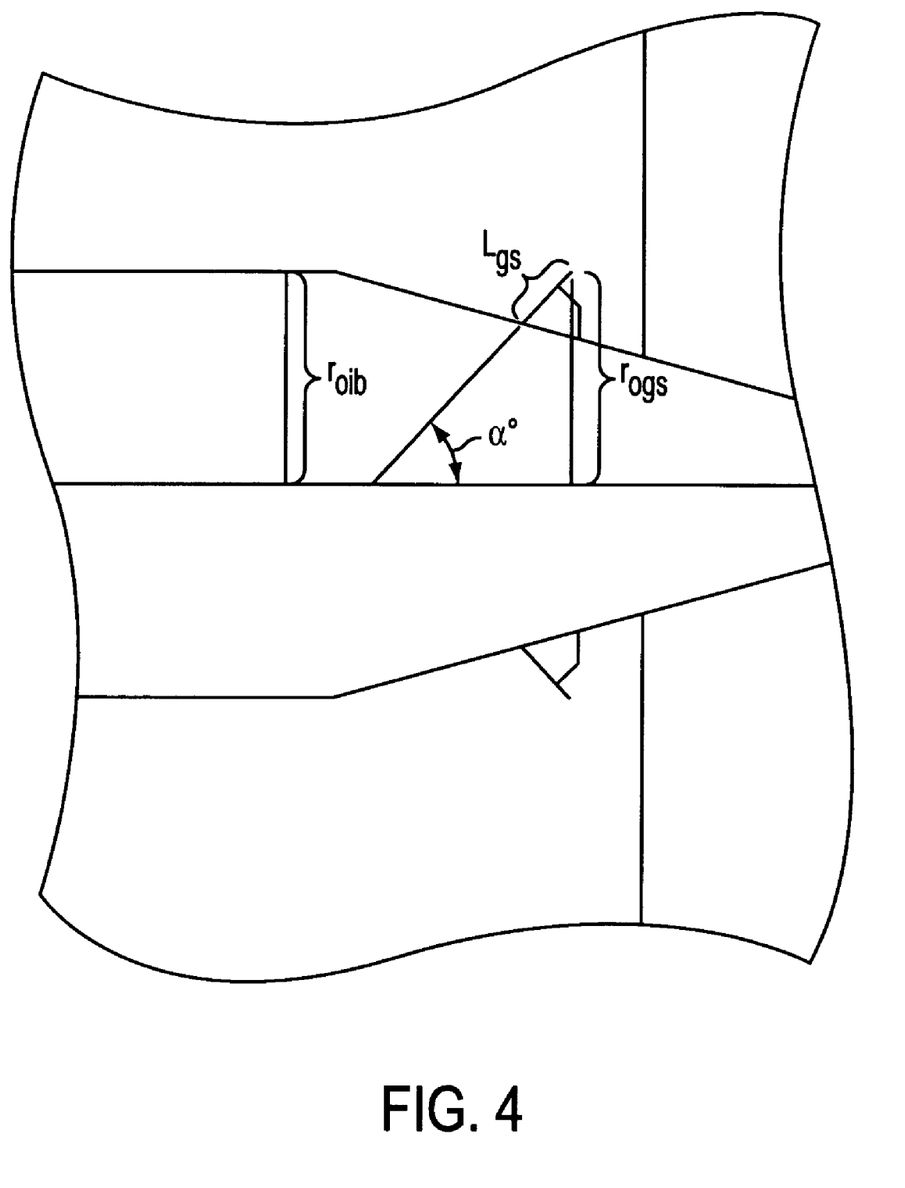
FIG. 4 is a close-up, partial view of the exhaust diffuser assembly shown in FIG. 2, showing particular detail of the flow deflecting member.

As seen with reference to FIG. 4, working fluid 18 leaving the engine turbine section 14 is characterized by a first velocity profile 38 upon entering the flowpath first region 32 and a second velocity profile 40 upon leaving the second region 34. The second velocity profile 40 is generated by the flow deflecting member 36 as the working fluid 18 flows through the flowpath first region 32 and into the flowpath second region 34. With continued reference to FIG. 2, and with additional reference to FIGS. 3 and 4, the flow deflecting member 36 encircles the inner boundary sleeve 22 and resembles a tapered ring that includes an upstream-facing guide surface 56. The guide surface 56 is oriented to direct working fluid 18 into a desired course within the flowpath second region 34. As seen with particular reference to FIG. 4, the guide surface 56 is substantially linear and is characterized by three defining dimensions: a surface length $L_{gs}$, a deflection angle $\alpha$, and an outer radius $r_{ogs}$. The surface length $L_{gs}$ is the distance from the distal end of the guide surface 56 to the inner boundary sleeve 22; the deflection angle $\alpha$ is measured between the central axis 24 and the guide surface 56; and the outer radius $r_{ogs}$ is the distance between the central axis 24 and the radially-outward end of the guide surface. It has been determined that the flow deflecting member 36 functions best when the guide surface 56 deflection angle $\alpha$ lies below about forty-five degrees. Additionally, to allow appropriate working fluid 18 divergence within the flowpath first conditioning zone 42, the flow deflecting member 36 is axially positioned within the second conditioning zone 44, and more particularly, along the inner boundary sleeve second portion 54. Other axial locations may be used if fluid divergence is not critical.

With a linear guide surface embodiment, as shown in FIGS. 4 and 5, the guide surface 56 defining dimensions $L_{gs}$, $\alpha$, $r_{ogs}$ are interrelated and cooperatively determine the flowpath second profile 40 produced during operation. The flow deflecting member 36 may, as shown in the embodiment of FIG. 5, be configured to deliver heat to the HRSG 12 in a radially-uniform manner, ensuring maximum contact between the working fluid 18 and the heat extracting surfaces (not shown) of the HRSG, while reducing concentrations of unacceptably-high temperatures within the working fluid. This uniform heat distribution not only increases HRSG effectiveness but also improves HRSG life.

With continued reference to FIG. 4, this radial distribution is generated when the guide surface outer radius $r_{ogs}$ is no larger than the outer radius $r_{oib}$ of the inner boundary sleeve 22 in the inner boundary first portion 50. As noted above, the deflection angle $\alpha$ provides optimal performance when below about forty-five degrees, and the defining dimensions are interrelated; therefore, once outer radius $r_{ogs}$ is selected, the appropriate surface length $L_{gs}$ is a matter of geometry, with the appropriate length generating a guide surface 56 having a desired outer radius $r_{iob}$ and a deflection angle α of about forty-five degrees.

Other flow profiles may be produced. For example, it may be desired in some cases to direct a higher concentration of heat toward the outer boundary sleeve. In instances where an associated HRSG 12' has been exposed to center-peaked, or "hub-strong" concentrations of heat for extended periods of time, it may be desirable to direct heat away from previously-damaged, radially-inward HRSG regions. As will be discussed further below, it is also possible to ensure a uniformly-distributed velocity profiles and outwardly-biased velocity profiles, as well. In engines 16 that do not have HRSGs 12, it would still be advantageous to not have hot spots in the center portion of the exhaust ducting down stream of the diffuser section of the engine, for example in settings where plant ducting (not shown) makes a turn and centrally-located hot spots might damage the associated turning elbow (not shown). In such instances, the outer radius $r_{ogs}$ is, as shown in FIG. 6, selected to be larger than the outer radius $r_{iob}$ of the inner boundary sleeve 22. It is noted that the outer radius $r_{ogs}$ need not be larger than the radius $r_{iob}$ of the inner boundary sleeve 22 in order to deflect the flow outward. The appropriate surface length $L_{gs}$ is again a matter of geometry, with the appropriate length generating a guide surface 56' having a desired outer radius $r_{iob}$ and a deflection angle α of about forty-five degrees. This profile ', while not necessarily maximizing energy extraction, will extend the useable life of a heat-stressed HRSG 12' by diverting heat away from damaged regions.

It is noted that while the guide surface 56 has been shown and described as being substantially linear, other orientations, such as concave and/or convex contours or a combination of straight and convex/concave contours would also suffice. The guide surface could also, as shown in the Figures have a ramped section, followed by another section(s). It is noted, for example, that the guide surface could angle away from the centerline (as shown) and then have a straight section (not shown), and then angle back (not shown) toward the centerline. It is also noted that the guide surface need not intersect the inner boundary sleeve.

During operation, fuel (not shown) and air (not shown) combust in an engine 16 combustor section 15 to produce hot working fluid 18 that travels into a turbine section 14, where energy is extracted. As shown in FIG. 5, the working fluid 18 then exits the turbine section 14 and travels through the exhaust diffuser assembly 10 to a downstream HRSG 12. The flow deflecting member 36 in the exhaust diffuser assembly 10 produces a profile 40 within the working fluid 18 that provides strategically-selected/tuned interaction between the HRSG 12 and the working fluid. For example, if $r_{ogs}$ is $<=r_{oib}$ then heat is distributed to the HRSG in an evenly-distributed profile, as shown in FIG. 5. If, however, $r_{ogs}$ is $>r_{oib}$ then resulting profile would have a so-called "rim-strong or rim-centered" distribution, as shown in FIG. 6, tending to deliver more heat toward the outer boundary sleeve 20 and radially-outward regions of the flowpath 26.

With the arrangement described above, the exhaust diffuser assembly 10 of the present invention advantageously allows the second flowpath region 34 velocity profile distribution to be tuned. Accordingly, with the exhaust diffuser assembly 10 of the present invention, heat may be delivered to the HRSG 12 in a variety of configurations, each of which help maximize HRSG life and effectiveness under diverse operational conditions.

According to one aspect of the invention, heat may be delivered in an evenly-distributed manner thereby enhancing post-turbine-section energy extraction. This approach helps recover working fluid 18 energy that would otherwise be lost in settings, for example, with turbine final stage components that generate center-peaked/hub-strong velocity profiles. Hub-strong velocity profiles often concentrate hot working fluid 18 in one radial area locally overloading the heat exchanger and decreasing the overall efficiency of the HRSG, and the present invention 10 can redistribute the working fluid to ensure maximum heat-extracting interaction.

According to another aspect of the invention, the exhaust diffuser assembly 10 allows turbine sections 14 designs that are largely HRSG-independent. That is, the present invention 10 compensates for turbine sections 14 that maximize energy extraction while producing HRSG-damaging velocity profiles.

According to another aspect of the invention, the exhaust diffuser assembly 10 also helps maximize HRSG 12 operational life by allowing concentrations of unacceptably-high temperatures within exhaust streams 26 to be reduced or eliminated before reaching the HRSG 12, if needed. This beneficially allows operation at conditions, such as many low-power running conditions, which may produce center-peaked exhaust velocity profiles, allowing operation at these conditions for extended periods of time without sacrificing combined cycle efficiency or HRSG performance.

It is to be understood that while certain forms of the invention have been illustrated and described, it is not to be limited to the specific forms or arrangement of parts herein described and shown. It will be apparent to those skilled in the art that various, including modifications, rearrangements and substitutions, may be made without departing from the scope of this invention and the invention is not to be considered limited to what is shown in the drawings and described in the specification. The scope if the invention is defined by the claims appended hereto.

What is claimed is:

1. A turbine engine exhaust diffuser having a tunable exhaust velocity profile, comprising:
   an outer boundary member extending along a central axis;
   an inner boundary member located radially-inward of said outer boundary member and extending along said central axis;
   an exhaust flowpath disposed between said outer and inner boundary members;
   a flow deflecting member operatively connected to the inner boundary member and disposed within said flowpath, said flow deflecting member longitudinally dividing said flowpath into a first region characterized by a first predetermined velocity profile and a second region characterized by a second predetermined velocity profile, said second predetermined velocity profile being determined by at least one pre-selected dimension of said flow deflecting member, wherein said flow deflecting member is adapted to produce a substantially-uniform radial velocity distribution of fluid within said second region.

2. The turbine engine exhaust diffuser of claim 1, wherein said flow deflecting member is a substantially-continuous component extending circumferentially around said inner boundary member.

3. The turbine engine exhaust diffuser of claim 2, wherein said flow deflecting member extends radially away from said central axis a distance effective to divert fluid flowing through said flowpath toward said outer boundary sleeve.

4. The turbine engine exhaust diffuser of claim 1, wherein said flow deflecting member includes a guide surface adapted to direct fluid flowing therepast toward said outer boundary sleeve.

5. The turbine engine exhaust diffuser of claim 4, wherein said guide surface is substantially-linear.

6. The turbine engine exhaust diffuser of claim 5, wherein said guide surface forms an angle with said central axis less than about forty-five degrees.

7. The turbine engine exhaust diffuser of claim 1, wherein said inner boundary sleeve includes a non-tapered first portion characterized by a first outer radius measured from said central axis and a tapered second portion, said flow deflecting member being disposed within said second portion.

8. The turbine engine exhaust diffuser of claim 7, wherein said flow deflecting member extends radially away from said central axis by a second outer radius substantially equal to said first outer radius.

9. The turbine engine exhaust diffuser of claim 1, wherein said flowpath includes a first zone adapted to induce a first pressure drop within fluid passing therethrough and a second zone adapted to induce a second pressure drop within fluid passing therethrough.

10. The turbine engine exhaust diffuser of claim 9, wherein said flow deflecting member is located within said second zone.

* * * * *